United States Patent
Deppe et al.

(10) Patent No.: US 9,134,116 B2
(45) Date of Patent: Sep. 15, 2015

(54) METHOD AND APPARATUS FOR MEASUREMENT OF THE PROFILE GEOMETRY OF CYLINDRICAL BODIES

(75) Inventors: Gerd-Joachim Deppe, Krefeld (DE); Norbert Schönartz, Rheurdt (DE); Holger Brauer, Gelsenkirchen (DE); Jörn Winkels, Werl (DE)

(73) Assignee: SALZGITTER MANNESMANN LINE PIPE GMBH, Siegen (DE)

( * ) Notice: Subject to any disclaimer, the term of this patent is extended or adjusted under 35 U.S.C. 154(b) by 547 days.

(21) Appl. No.: 13/583,842

(22) PCT Filed: Feb. 2, 2011

(86) PCT No.: PCT/DE2011/000117
§ 371 (c)(1),
(2), (4) Date: Nov. 21, 2012

(87) PCT Pub. No.: WO2011/110144
PCT Pub. Date: Sep. 15, 2011

(65) Prior Publication Data
US 2013/0063590 A1    Mar. 14, 2013

(30) Foreign Application Priority Data
Mar. 11, 2010   (DE) .......................... 10 2010 011 217

(51) Int. Cl.
   *G01B 11/25*   (2006.01)
(52) U.S. Cl.
   CPC ...................................... *G01B 11/25* (2013.01)
(58) Field of Classification Search
   CPC ...................................... G01B 11/022
   USPC .................................................... 348/135–142
   See application file for complete search history.

(56) References Cited

U.S. PATENT DOCUMENTS

| 4,741,621 | A  |   | 5/1988  | Taft et al. |
| 5,015,867 | A  | * | 5/1991  | Siegel et al. ............. 250/559.24 |
| 5,669,871 | A  | * | 9/1997  | Sakiyama ..................... 600/117 |
| 7,081,606 | B2 | * | 7/2006  | Osaragi et al. ............. 250/206.1 |
| 2001/0012330 | A1 | * | 8/2001 | Ogura et al. ..................... 378/95 |
| 2006/0227210 | A1 | * | 10/2006 | Raab et al. ..................... 348/139 |
| 2006/0290781 | A1 | * | 12/2006 | Hama .......................... 348/135 |

(Continued)

FOREIGN PATENT DOCUMENTS

| DE | 40 37 383 A1 | 5/1992 |
| DE | 100 06 663 A1 | 8/2001 |

(Continued)

*Primary Examiner* — Paulos M Natnael
(74) *Attorney, Agent, or Firm* — Henry M. Feiereisen LLC

(57) ABSTRACT

A two-dimensional light-section method for measuring the profile geometry of cylindrical bodies is disclosed. A fan-shaped laser line forming a light-section line on the surface of the body is imaged with at least one laser, and the laser radiation reflected from the surface of the body is captured by at least one area imaging camera, wherein the laser and the camera are arranged at a triangulation angle in a normal plane aligned with the cylinder axis. The profile geometry is then measured by pivoting the laser out of the normal plane about the cylinder axis. The angle with respect to the normal plane is selected such that the optical axis of the area imaging camera with respect to the surface of the cylinder is located within the glancing angle range of the reflected beams.

8 Claims, 2 Drawing Sheets

(56) References Cited

U.S. PATENT DOCUMENTS

2008/0304041 A1* 12/2008 Ohtomo et al. .............. 356/4.01
2009/0100901 A1*  4/2009 Spalding ........................ 73/1.81
2010/0149525 A1*  6/2010 Lau .......................... 356/139.03
2011/0007153 A1*  1/2011 Webster et al. ............... 348/135
2012/0242830 A1*  9/2012 Kumagai et al. .............. 348/135
2012/0300065 A1* 11/2012 Willemann et al. ........... 348/136
2012/0327221 A1* 12/2012 Christoph et al. ............ 348/135

FOREIGN PATENT DOCUMENTS

| DE | 102007026900 | 12/2008 |
| JP | 57144404 | 9/1982 |
| WO | PCT/DK96/00136 | 10/1996 |

* cited by examiner

Longitudinal section

Cross-section

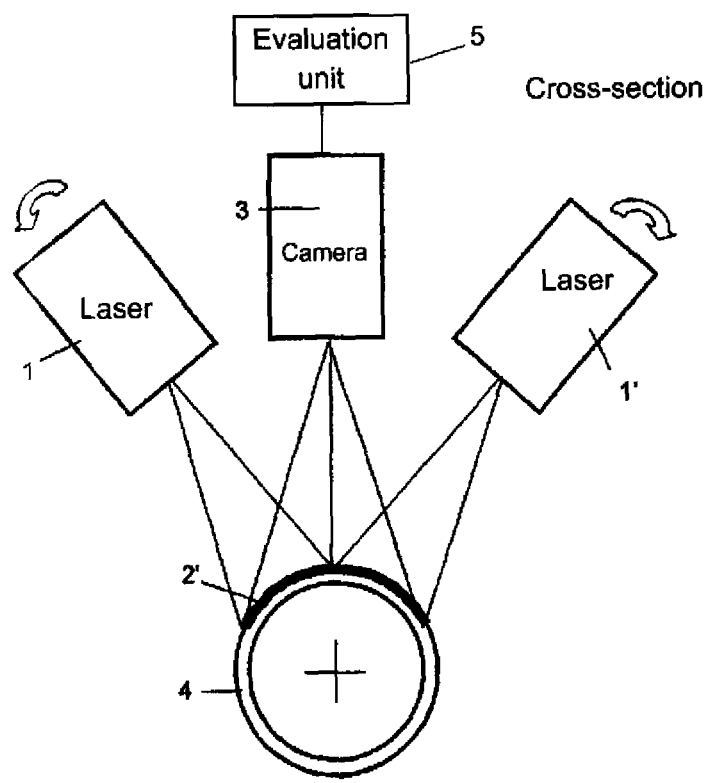
Figure 2 (Present invention)

METHOD AND APPARATUS FOR MEASUREMENT OF THE PROFILE GEOMETRY OF CYLINDRICAL BODIES

CROSS-REFERENCES TO RELATED APPLICATIONS

This application is the U.S. National Stage of International Application No. PCT/DE2011/000117, filed Feb. 2, 2011, which designated the United States and has been published as International Publication No. WO2011/110144 and which claims the priority of German Patent Application, Serial No. 10 2010 011 217.8, filed Mar. 11, 2010, pursuant to 35 U.S.C. 119(a)-(d).

BACKGROUND OF THE INVENTION

The invention relates to a method for measurement of the profile geometry of spherically curved, particularly cylindrical, bodies and to an apparatus for carrying out the method.

The present invention relates in particular to an optical profile measurement, which is implemented without contact using the laser-section method as a two-dimensional triangulation method known per se.

A three-dimensional "overall profile" of the measurement object, like e.g. a tube, can hereby be constructed by joining the successively captured two-dimensional "profile sections", when sensor and measurement object move relative to one another.

The profile measurement considered within the context the present invention is in its one-dimensional implementation based on the known point triangulation, wherein a laser and a linear position-sensitive detector form the triangulation sensor. Laser beam axis and optical axis of the detector span a plane referred to hereinafter as "normal plane" and enclose a triangulation angle. The distance of the measurement object from the sensor in the direction of the laser beam normally constitutes the measured variable. This method is known e.g. from DE 40 37 383 A1.

The extension of the point triangulation to two dimensions is the subject matter of the present patent application. In this also generally known light-section method, the point-shaped laser beam is replaced by a laser beam fan and the one-dimensional, linear detector is replaced by a two-dimensional area detector.

In the known method, the extension is implemented orthogonally and symmetrically with respect to the normal plane as designated above. The respective measurement field on the measurement object is imaged onto the detector by an objective, with the objective and detector forming a two-dimensionally operating area imaging camera.

The laser beam fan is typically generated by diffractive optics mounted in front of the point-shaped laser beam exit and thus produces a line on the measurement object referred to as "light-section line".

When applying the aforedescribed method to cylindrical measurement objects, for example—but not necessarily—tubes, the light-section line is typically oriented perpendicular to the tube axis. When the tubes are transported in direction of a longitudinal axis or when the sensor is moved accordingly, a three-dimensional profile of the tube geometry can be captured in a continuous measurement, as mentioned above.

When applying the light-section measurement in the aforedescribed manner and arrangement, a disadvantage caused by the geometry of the measurement object becomes evident, which even makes to some extent an exact determination of the profile geometry impossible.

FIG. 1 schematically illustrates the conventional two-dimensional light-section measurement of a cylindrical tube. The measurement uses an image of a surface of the measurement object 4 imaged on a detector, which is constructed as a camera 3, wherein the surface is illuminated by a projected fan-shaped laser line 2 emitted from a laser 1.

The image on the left-hand side of the drawing shows schematically the view as a longitudinal section and the image on the right-hand side as cross-section in relation to the longitudinal axis of the measurement object 4. The light-section arrangement of laser 1 and camera 3 are hereby arranged in the normal plane aligned with the longitudinal axis of the measurement object, with the angle enclosed between the axis of the laser beam fan 5 of the laser 1 and the optical axis 6 of the camera 3 being the triangulation angle in longitudinal section.

A disadvantage of this arrangement is that only a relatively small part of the laser beam energy scattered back from the object surface reaches the camera 3 for evaluation. In particular, the energy per exposure time interval is relevant in particular when performing a dynamic measurement, a fact that is critical especially for a rapid relative movement between camera 3 and measurement object 4 and an accompanying necessarily short exposure time and may even make a three-dimensional profile measurement impossible.

When applied to the cylindrical geometry, this disadvantage of the measurement with the known method is amplified by the angle conditions due to the fan-shaped widening of the laser beam 2 and has therefore an impact particularly in the marginal regions of the measurement field, in particular where a still smaller portion of backscattered laser energy is captured by the camera 3 due to the curvature of the surface.

The drop in intensity in the marginal areas of the imaged light-section line is also disadvantageous for the signal/noise ratio in the evaluation of the measurement signals and thus ultimately for the measurement accuracy of the signals.

Although an increase in the output power of the laser generally improves the signal/noise ratio, it disadvantageously increases the complexity of the laser and the laser safety.

Although a possible increase in the exposure time of the camera is principally possible, this is however ruled out when a relative movement between sensor and measurement object is rapid because of the increasing motion blur.

In principle, a steeper viewing angle of the camera (i.e. a steeper triangulation angle) would be conceivable with a typical scattering characteristic of the measurement object surface; however, this would reduce in particular the measurement resolution.

The afore-mentioned three measures would however not be able to solve the problem of uneven intensity distribution during the image acquisition; in the presence of adequate edge intensity, there would even be the risk of overexposing the central region.

The present invention is therefore based on the object to provide an easy-to-implement method for measurement of the profile geometry of a measurement object using two-dimensional light-section method of spherical, in particular cylindrical, bodies, which is able to overcome the described disadvantages. A further object is to provide a corresponding apparatus.

SUMMARY OF THE INVENTION

This object is solved by a method for measurement of the profile geometry of spherically curved, in particular cylindrical, bodies as measurement objects using a two-dimensional light-section method, wherein a fan-shaped laser line is imaged with at least one laser as a light-section line on the surface of the body and the beams reflected from the surface of the body are captured by at least one area imaging camera, wherein the laser and the camera are arranged at a triangulation angle in the normal plane aligned with the cylinder axis and the measured values are subsequently transmitted to an evaluation unit for representing the profile geometry, wherein for measuring the profile geometry, the laser is pivoted out of the normal plane about the cylinder axis, with the angle in relation to the normal plane being selected such that the optical axis of the area imaging camera in relation to the surface of the cylinder is located in the glancing angle range of the reflected beams.

According to the teaching of the invention, the profile geometry is measured by pivoting the laser about the cylinder axis away from the normal plane, with the angle in relation to the normal plane being selected such that the optical axis of the area imaging camera is located in the glancing angle range of the reflected beams in relation to the surface of the cylinder.

The invention readily overcomes the described disadvantages of the conventional methods with a novel spatial arrangement of the recording camera and laser beam fan while taking into account the characteristic geometry of the measurement object.

The proposed innovation will now be described by way of example for a measurement object with cylindrical geometry, but it is equally applicable for other spherical geometries, e.g. flank profiles.

Whereas in the conventional embodiments of the light-section method the laser and the camera are arranged in the above-defined normal plane aligned with the cylinder axis, the laser according to the proposed innovation is deliberately pivoted out of this plane about the cylinder axis so that the laser illuminates the surface at an angle.

Advantageously, the laser and camera are arranged such that the recording angle relative to the cylinder surface lies in the glancing angle range for the arrangement of the axis of the laser beam fan and the optical axis of the recording camera.

The glancing angle generally represents the angle at which dull surfaces, which do not exhibit an ideal mirror-like reflection, exhibit enhanced reflection of light at a certain angle, i.e. the surfaces "glance". Unlike with the known measuring techniques, this effect is now used to intensify the reflection of the laser beams into the camera also from the critical marginal areas of the measurement object by deliberately pivoting of the laser out of the normal plane.

BRIEF DESCRIPTION OF THE DRAWING

FIG. 2 shows in a cross-sectional view an arrangement with two lasers according to the present invention.

DETAILED DESCRIPTION OF PREFERRED EMBODIMENTS

Figure 1:
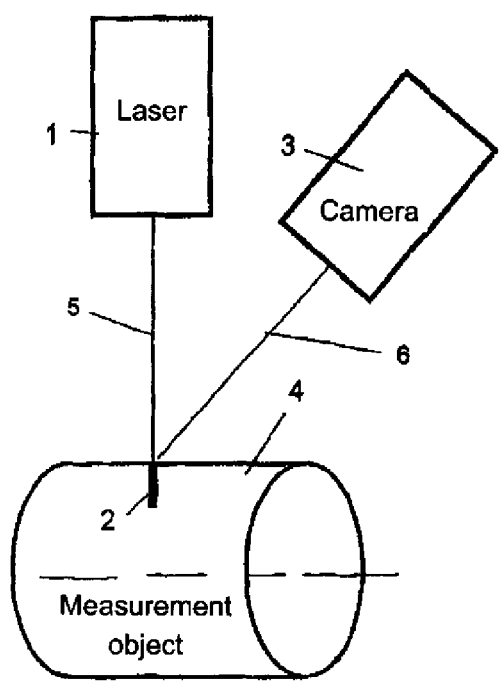
FIG. 1 schematically illustrates the conventional two-dimensional light-section measurement of a cylindrical tube.
Figure 1:
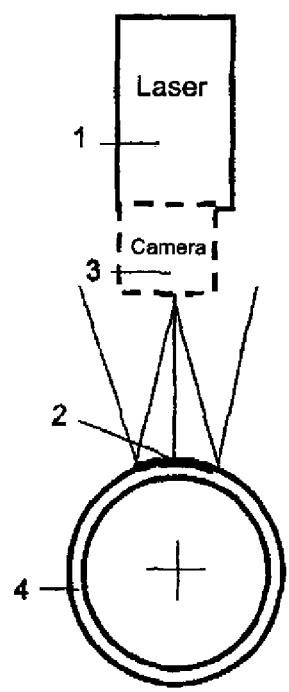

In a typical application wherein the measuring field is symmetric to the normal plane, two lasers are advantageously used in a symmetric arrangement (FIG. 2).

For same length of the light-section line on the circumference of the cylinder, a larger acquisition area, i.e. profile measuring range, is obtained as a result of the proposed novel arrangement, as shown in the cross-sectional view in FIG. 2.

In accordance with the invention, the laser 1, 1' is pivoted about the cylinder axis out of the normal plane while retaining the triangulation angle (projected onto the normal plane)—and thus also the distance resolution of the profile measurement.

When combining a continuous light-section line from two portions of the laser line 2' projected onto the surface of the measurement object 4, the two portions are mutually aligned straight lines, with the beams reflected from the surface being captured by the camera 3 arranged between the lasers 1, 1' and transmitted onward to an evaluation unit 5.

The arrangement with two lasers disposed on both sides of the normal plane in which the camera is located, has also proven advantageous for the extension to a multi-channel arrangement capable of capturing the entire circumference of the cylinder. The same number of cameras and laser beam fans are used. The necessary number of channels is established in each individual situation case by the cooperation of reflectivity of the cylinder surface, laser output, and (necessary) exposure time.

The invention claimed is:

1. A two-dimensional light-section method for measuring a profile geometry of a spherically curved body having a body axis and representing a measurement object, said method comprising:
    imaging a fan-shaped laser line from at least one laser on a surface of the body as a light-section line,
    arranging at least one area-imaging camera in a normal plane defined by a laser beam axis of the at least one laser and the body axis,
    pivoting the laser out of a normal plane about the axis by a pivot angle selected such that an optical axis of the area imaging camera in relation to the surface of the measurement object is located in the glancing angle range of the reflected beams,
    capturing laser radiation reflected from the surface of the body with the at least one area-imaging camera, and
    transmitting measured values derived from the captured laser radiation to an evaluation unit for representing the profile geometry.

2. The method of claim 1, wherein the measurement object is a cylindrical body and the axis is a cylinder axis.

3. The method of claim 1, wherein the profile geometry of the measurement object is measured using a plurality of lasers distributed about a circumference of the measurement object, wherein each of the plurality of lasers forms a fan-shaped laser line, with the fan-shaped laser lines from the plurality of lasers partially overlapping one another and being located on a common line on the measurement object, and wherein laser radiation reflected from the surface of the measurement object is detected by a plurality of cameras arranged in spaces between the plurality of lasers.

4. The method of claim 3, wherein the plurality of lasers and the plurality of cameras used for a circumferential measurement of the measurement object have identical numbers.

5. An apparatus for measuring a profile geometry of a spherically curved body having a body axis and representing a measurement object, the apparatus comprising:
    at least one a laser emitting a laser beam defining a beam axis and projecting a fan-shaped laser line onto the measurement object,
    at least one area imaging camera defining a camera axis enclosing a triangulation angle with the beam axis and arranged in a normal plane defined by the at least beam axis and the axis, the at least area imaging camera constructed to detect laser radiation reflected from a surface of the measurement object, and an evaluation unit operatively connected to the at least one a laser and the at least one area imaging camera for representing the profile geometry, wherein the beam axis is pivoted out of the normal plane and is incident onto the surface of the measurement object at an angle different from normal incidence, and wherein the camera axis in relation to the surface area of the measurement object is located in a glancing angle range of the reflected laser radiation.

6. The apparatus of claim 5, comprising a plurality of lasers distributed circumferentially about the measurement object, with each laser forming a fan-shaped laser line located on a common line and partially overlapping one another, and a plurality of cameras arranged in spaces between the plurality of lasers for detecting laser radiation reflected from the surface of the measurement object.

7. The apparatus of claim 5, wherein the plurality of lasers and the plurality of cameras circumferentially distributed about the measurement object have identical numbers.

8. The apparatus of claim 5, wherein the measurement object is a cylindrical body and the axis is a cylinder axis.

* * * * *